United States Patent
Lee et al.

(10) Patent No.: US 9,729,688 B2
(45) Date of Patent: Aug. 8, 2017

(54) MOBILE TERMINAL

(71) Applicant: LG Electronics Inc., Seoul (KR)

(72) Inventors: Haklim Lee, Seoul (KR); Wonseok Joo, Seoul (KR); Hanseok Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/844,615

(22) Filed: Sep. 3, 2015

(65) Prior Publication Data

US 2016/0127525 A1    May 5, 2016

(30) Foreign Application Priority Data

Oct. 30, 2014 (KR) .................. 10-2014-0149435

(51) Int. Cl.
*H04M 1/02* (2006.01)
*G06F 1/16* (2006.01)

(52) U.S. Cl.
CPC ....... *H04M 1/0279* (2013.01); *H04M 1/0208* (2013.01); *G06F 2203/04102* (2013.01); *H04M 1/0268* (2013.01)

(58) Field of Classification Search
CPC ............................. G05F 1/1652; G06F 1/1601
USPC .......................................................... 455/566
See application file for complete search history.

(56) References Cited

U.S. PATENT DOCUMENTS

| | | | | |
|---|---|---|---|---|
| 6,577,496 | B1* | 6/2003 | Gioscia | G06F 1/1616 345/156 |
| 2014/0029171 | A1* | 1/2014 | Lee | H05K 7/16 361/679.01 |
| 2014/0133073 | A1 | 5/2014 | Ahn et al. | |
| 2014/0196254 | A1* | 7/2014 | Song | E05D 3/14 16/302 |
| 2014/0226275 | A1* | 8/2014 | Ko | G06F 1/1626 361/679.27 |
| 2015/0378397 | A1* | 12/2015 | Park | G06F 1/1652 361/679.27 |

FOREIGN PATENT DOCUMENTS

| | | |
|---|---|---|
| KR | 1020110006787 A | 1/2011 |
| KR | 1020130073331 A | 7/2013 |
| KR | 1020140049911 A | 4/2014 |
| KR | 1020140120585 A | 10/2014 |

\* cited by examiner

*Primary Examiner* — Muthuswamy Manoharan
(74) *Attorney, Agent, or Firm* — Dentons US LLP

(57) ABSTRACT

A mobile terminal includes: a body in which an electronic component is installed; and a movement unit fastened to the body in at least a portion thereof, configured to output information processed in the mobile terminal, and the movement unit being flexible on the body as curvature of the body is varied, wherein the body includes a varied portion whose curvature is varied and fixed portions formed on both ends of the varied portion and having curvature which is not changed, wherein the varied portion includes a plurality of micro blocks formed in a movement direction and configured to form a predetermined curvature and an elastic member formed in the micro blocks and enabling the micro blocks to form a predetermined curvature when external force is applied or when external force is removed.

4 Claims, 11 Drawing Sheets

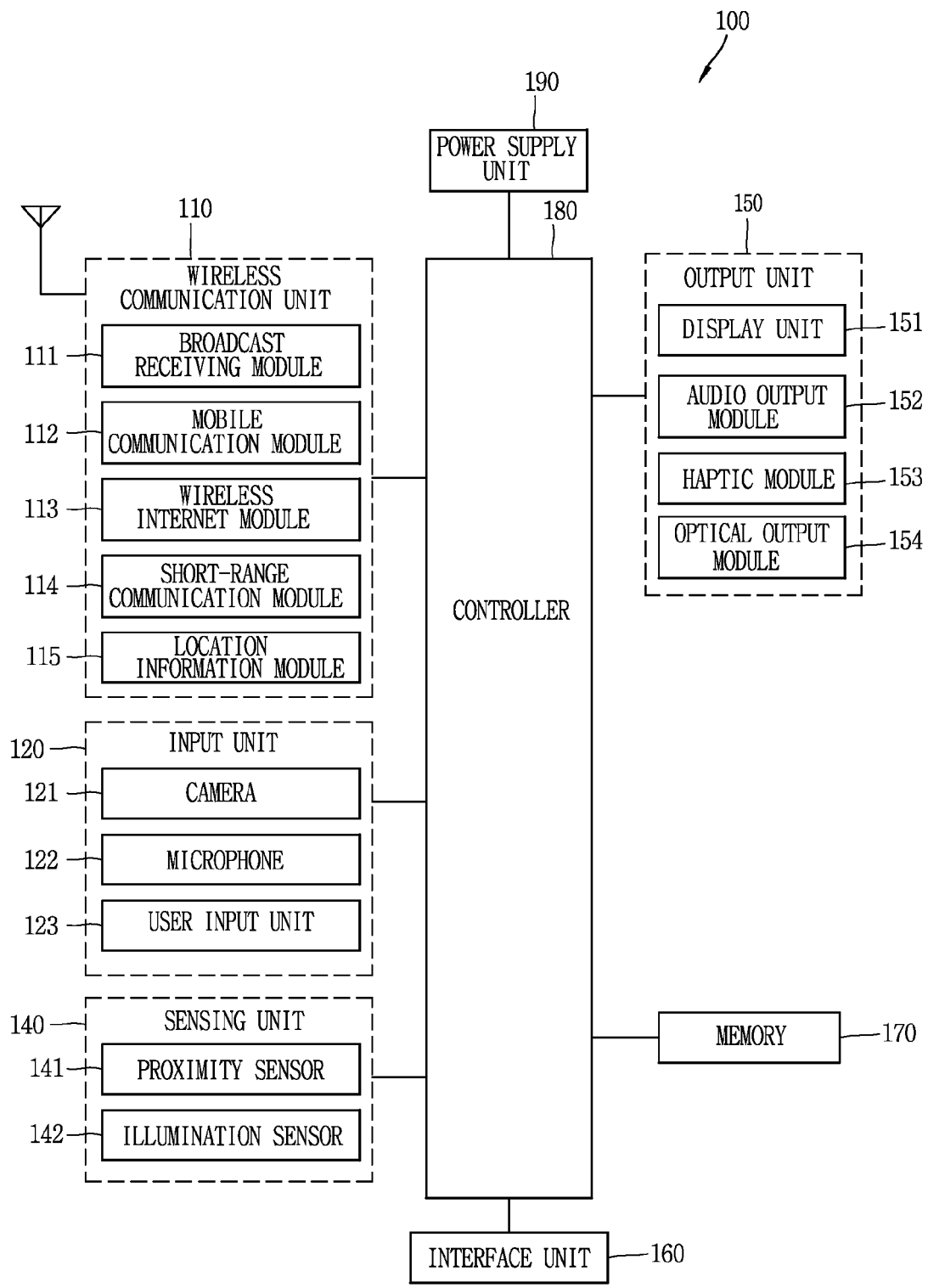

MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0149435, filed on Oct. 30, 2014 the contents of which is incorporated by reference herein in its entirety.

BACKGROUND OF THE INVENTION

1. Field of the Invention

The present disclosure relates to a mobile terminal bent with a predetermined curvature according to user convenience.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Mobile terminals having fixed curvature have been released. However, in a case in which a mobile terminal has fixed curvature, when it is put in a pocket or when it is carried around, it bulges, causing user inconvenience.

SUMMARY OF THE INVENTION

Therefore, an aspect of the detailed description is to provide a mobile terminal in which a curved surface is deformed to a planar surface or a planar surface is deformed to a curved surface and a method of controlling the same.

To achieve these and other advantages and in accordance with the purpose of this specification, as embodied and broadly described herein, a mobile terminal may include: a body in which an electronic component is installed; and a movement unit fastened to the body in at least a portion thereof, configured to output information processed in the mobile terminal, and the movement unit being flexible on the body as curvature of the body is varied, wherein the body includes a varied portion whose curvature is varied and fixed portions formed on both ends of the varied portion and having curvature which is not changed.

The varied portion may include: a plurality of micro blocks formed in a movement direction and configured to form a predetermined curvature; and an elastic member formed in the micro blocks and enabling the micro blocks to form a predetermined curvature when external force is applied or when external force is removed.

Rails may be provided on upper and lower ends of the movement unit and the rails may be inserted into guide grooves formed in the fixed portions and moved.

A friction reducing member may be provided between the rails and the guide grooves.

A stopper may be formed in each of the fixed portions, a hook may be formed on a rear surface of the movement unit, and the hook may be fastened to the stopper to maintain curvature of the varied portion.

Both ends of the micro blocks may be connected to a side wall of the varied portion, and a side wall of the varied portion and a side wall of the movement unit may have a concavo-convex shape.

Recesses may be formed at predetermined intervals on the side wall of the varied portion, and holes may be formed between the recesses.

The elastic member may be any one among a shape memory wire provided to penetrate through the micro blocks, an elastic plate attached to the micro blocks, and a coil spring attached to the micro blocks or penetrating through the micro blocks.

A protrusion may be formed toward the body in the center of the movement unit, and the protrusion may be fixedly coupled to the elastic member together with the micro blocks.

The micro-blocks may have a shape in which an upper portion thereof is narrow and a lower portion thereof is wide with respect to the center of the curvature.

The mobile terminal according to exemplary embodiments of the present disclosure has the following advantages.

According to at least one of the exemplary embodiments of the present disclosure, the mobile terminal may be deformed from a curved surface to a planar surface or deformed from a planar surface to a curved surface according to a user convenience.

Also, according to at least one of the exemplary embodiments of the present disclosure, the mobile terminal may be carried around in a planar state, and may be deformed to be curved when playing video to provide a sense of immersion to the user, and have a curvature during call communication to provide user convenience.

In addition, according to at least one of the exemplary embodiments of the present disclosure, a feeling of folding may be naturally provided by varying a curvature at least two or more steps, and the user may arbitrarily change the curvature according to an environment and an angle in which the user views a screen.

Besides, power may be turned on and off according to a planar state and a curved state, and a size of an object may be easily adjusted when an image is captured by zooming in and out a camera.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal according to an exemplary embodiment of the present disclosure.

DETAILED DESCRIPTION OF THE INVENTION

Figure 1B:
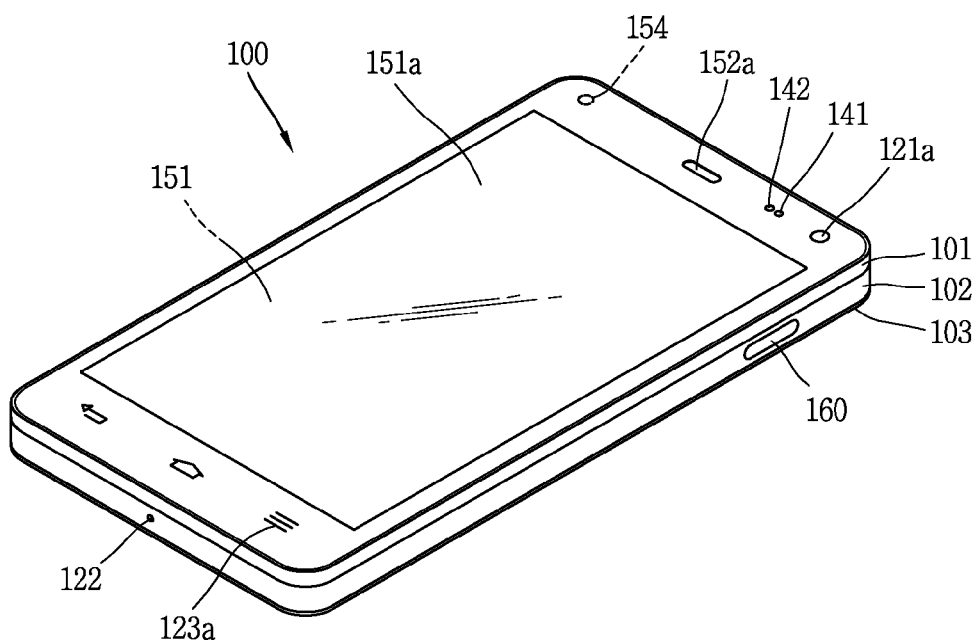
FIGS. 1B and 1C are conceptual views of one example of a mobile terminal, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
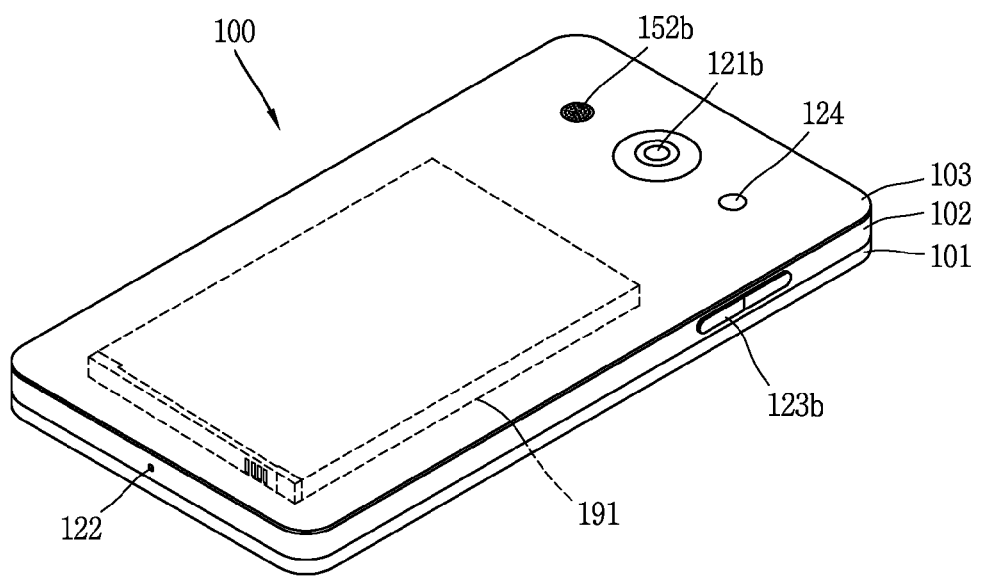

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 2A:
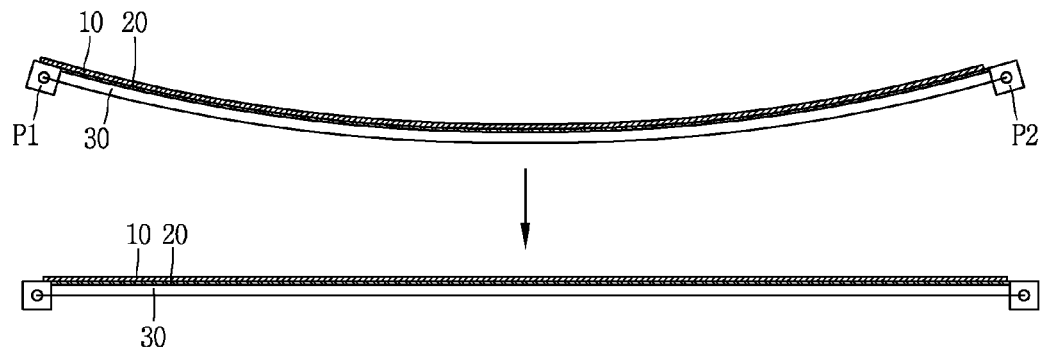
FIGS. 2A through 2C are schematic views illustrating a concept related to an exemplary embodiment of the present disclosure.
Figure 2B:
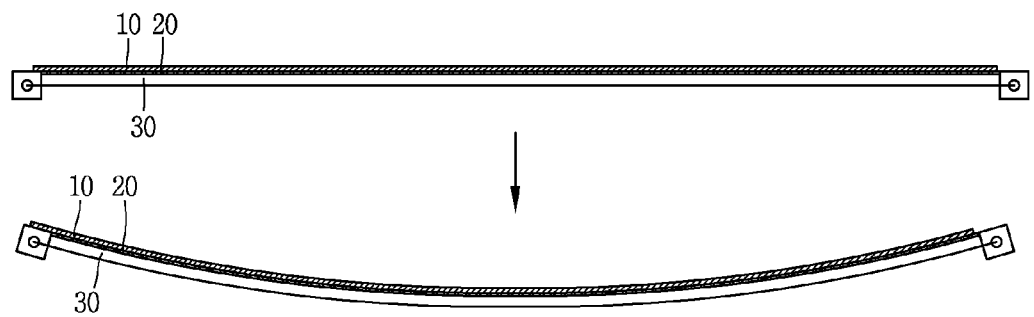
Figure 2C:
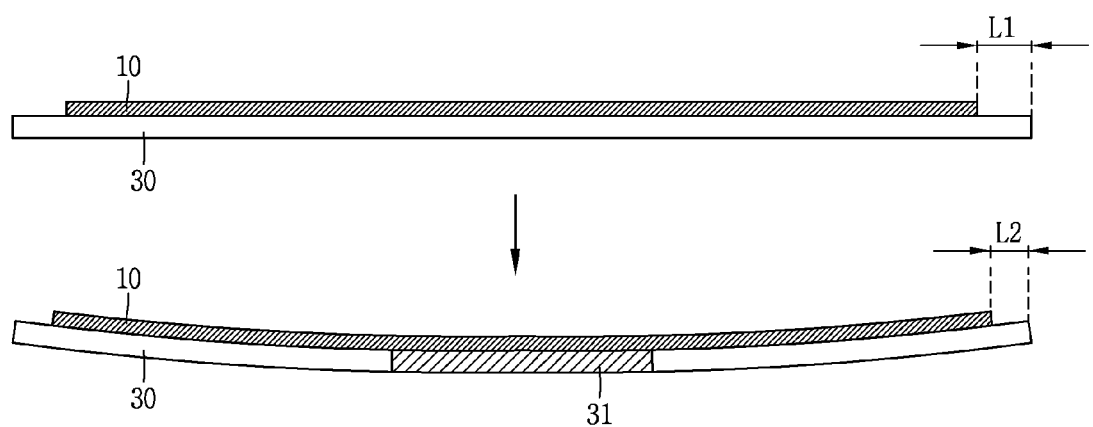

FIGS. 2A through 2C are schematic views illustrating a concept of generating curvature related to an exemplary embodiment of the present disclosure.

In an exemplary embodiment of the present disclosure, a mobile terminal deformed from a curved surface to a planar surface or from a planar surface to a curved surface is provided. Specifically, FIG. 2A is a view illustrating a concept of deforming the mobile terminal 200 from a curved surface to a planar surface, in which a basic state of the mobile terminal 200 is a curved state and a deformed state is a flat state, and FIG. 2B is a view illustrating a concept of deforming the mobile terminal 200 from a planar surface to a curved surface, in which a basic state is a flat state and a deformed state is a curved state having a predetermined curvature.

Referring to FIG. 2A, a panel 10 is attached to one surface of an elastic plate member 20 having a predetermined curvature, and a case 30 is attached to the other surface of the elastic plate member 20. Here, the panel 10 corresponds to an LCD panel 210 of the mobile terminal 200, and the case 30 corresponds to a terminal body (case) of the mobile terminal 200. Fixed points P1 and P2 are disposed in both ends of the elastic plate member 20, and the elastic plate member 20 and the case 30 may be curved with respect to the fixed points P1 and P2.

Since the elastic plate member 20 is formed to have a predetermined curvature in a basic state and the panel 10 and the case 30 are attached to the elastic plate member 20, the panel 10 and the case 30 attached to the elastic plate member 20 have curvature substantially the same as the curvature of the elastic plate member 20 at an initial stage. Thereafter, when the elastic plate member 20 is unfolded by applying external force to both ends of the elastic plate member 20, the panel 10 and the case 30 are also spread. However, when the external force is removed, the elastic plate member 20 is returned to the basic state by restoring force of the elastic plate member 20. Thus, in a state in which the mobile terminal 200 is deformed from the basic state to the deformed state, if the deformed state is to be maintained, a separate operation is required. In this respect, in an exemplary embodiment of the present disclosure, the deformed state is maintained by using a hook 211 and a stopper 233.

Through this process, after the mobile terminal 200 is deformed to the planar state from the state of being curved with a predetermined curvature at an initial state, the deformed state may be maintained.

FIG. 2B illustrates a configuration in which a basic state is a planar state and a deformed state is a curved state, opposite to the configuration of FIG. 2A. in this case, when external force is applied to the elastic plate member 20, force to returning the elastic plate member 20 to the planar state exerts. Thus, after the elastic plate member 20 is curved by applying external force to both ends of the elastic plate member 20, the hook 211 and the stopper 233 as mentioned above are required in order to maintain the curved state. In general, when the mobile terminal 200 is kept in storage, it may be convenient to maintain the mobile terminal 200 in a planar state, and when video is played, it may be convenient for the mobile terminal 200 to be in a curved state to allow the user to be immersed in the screen, which corresponds to the case of FIG. 2B in many cases. However, even the case of FIG. 2B may also be within the scope of the present invention.

Here, the panel 10 corresponds to the LCD panel 210, and the case 30 corresponds to the terminal body 230. The LCD panel 210 may be a flexible display, and the present disclosure may also be applied when the LCD panel 210 is not a flexible display. When the LCD panel 210 is not a flexible display, a degree of curving may not be great, and thus, deformation of the case 30 may relatively increase.

That is, as illustrated in FIG. 2C, when the panel 10 is rarely changed in length, like the LCD panel 210, even though the case 30 is bent, the panel 10 is rarely changed in length. Meanwhile, the case is slightly increased in the curved state, compared with the planar state, and to this end, a varied portion 31 is provided in a middle portion of the case 30.

The varied portion 31 has elasticity, which may be easily curved when an external force is applied thereto. Here, the overall length of the case 30 may be slightly increased by the varied portion 31. Thus, there is a difference in lengths between the planar state and the curved state. That is, as illustrated in FIG. 2C, when a difference in length between the panel 10 and the case 30 in the planar state is L1 and a difference in length between the panel 10 and the case 30 in the curved state is L2, L1>L2. This is because, although the length of the case 30 increases, since the case 30 is curved with a predetermined curvature, the difference in length between the panel 10 and the case 30 is rather reduced when the curved state is viewed from above.

Thus, since the length of the panel 10 is rarely changed, a configuration allowing the case 30 combined with the panel 10 to be curved with a predetermined curvature is required. To this end, in an exemplary embodiment of the present disclosure, a movement section of the LCD panel 210 is prepared. This will be described hereinafter.

Figure 3A:
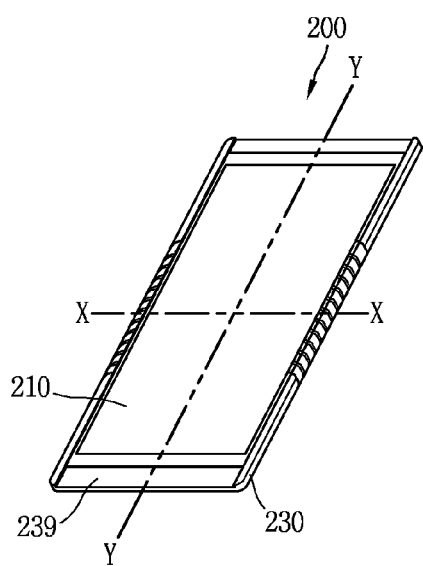
FIGS. 3A and 3B are front and rear perspective views of the mobile terminal related to an exemplary embodiment of the present disclosure.
Figure 3B:
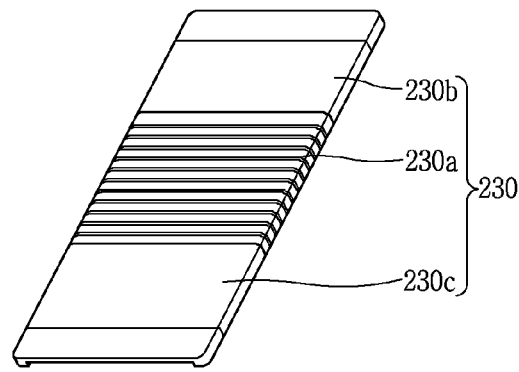
Figure 4:
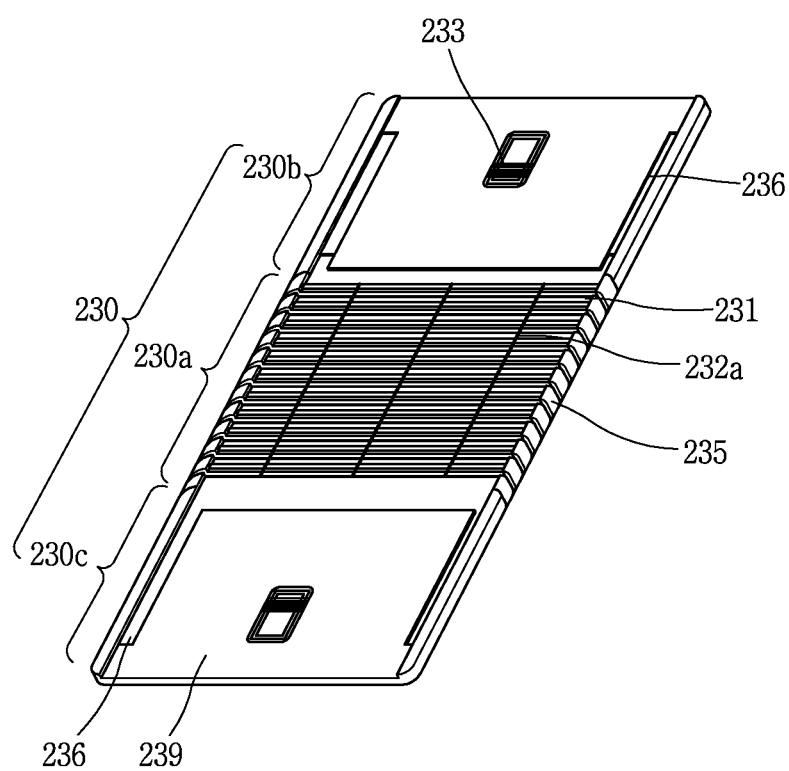
FIG. 4 is a front perspective view of a terminal body related to an exemplary embodiment of the present disclosure.

FIGS. 3A and 3B are front and rear perspective views of the mobile terminal related to an exemplary embodiment of the present disclosure, and FIG. 4 is a front perspective view of a terminal body related to an exemplary embodiment of the present disclosure. Hereinafter, an exemplary embodiment of the present disclosure will be described in detail with reference to FIGS. 3 and 4.

Hereinafter, a case in which a basic state is a planar state and a deformed state is a curved state will be largely described. However, the present disclosure is not limited thereto and may also be applied to a case in which the basic state s a curved state and the deformed state is a planar state. The case in which the basic state is a curved state is considered to be the same as a case in which the basic state is a planar state, except that an elastic member having a predetermined curvature is used, and thus, descriptions of the case in which the basic state is a planar state may also be used for the case in which the basic state is a curved state.

The mobile terminal 200 according to an exemplary embodiment of the present disclosure includes a terminal body 230 in which various electronic components 250 are installed, and a movement unit 210 fastened to the terminal body 230 in at least a portion and flexible or movable on the terminal body 230 as curvature of the terminal body 230 is varied. The terminal body 230 includes a varied portion 230a having curvature which is varied and fixed portions 230b and 230c formed in both ends of the varied portion 230a and having curvature which is not varied. Here, the fixed portions 230b and 230c may be formed only in one end portion of the varied portion 230a. However, when the fixed portion is formed only in one end portion of the varied portion 230a, force is not balanced in a length direction of the mobile terminal 200, and thus, preferably, the fixed portions 230b and 230c may be formed in upper and lower ends of the varied portion 230a.

In an exemplary embodiment of the present disclosure, the terminal body 230 includes the rear case 102 and the rear cover 103 of FIGS. 1B and 1C, and according to circumstances, the terminal body 230 may include the front case 101. Also, the terminal body 230 may be a uni-body in which the rear case 102 and the rear cover 103 are integrated. In this case, the movement unit 210 may be an LCD panel including a window and, here, the movement unit 210 may have any configuration as long as it is coupled to the terminal body 230, and the terminal body 230 may have electronic component 250 installed therein and may have an elastic member so as to be curved with predetermined curvature.

The electronic component 250 may be typically a printed circuit board (PCB), and may include electronic components such as various chips mounted on the PCB. That is, in the mobile terminal 200 according to an exemplary embodiment of the present disclosure, the electronic component 250 is installed in the terminal body 230 and the movement unit 210 covers the electronic component 250. Here, the movement unit 210 may be an LCD panel 210, and may be a flexible display but not necessarily. That is, the movement unit 210 may include a window, an LED module, and a frame supporting the LED module, but the present disclosure is not limited thereto.

In an exemplary embodiment, at least a portion of the movement unit 210 is fastened to the fixed portions 230b and 230c. That is, the movement unit 210 and the terminal body 230 may be combined to be curved with similar curvature. To this end, rails 215 are provided on both sides of the movement unit 210, and the rails 215 may be inserted into guide grooves 236 formed in the fixed portions 230b and 230c and moved.

Figure 8:
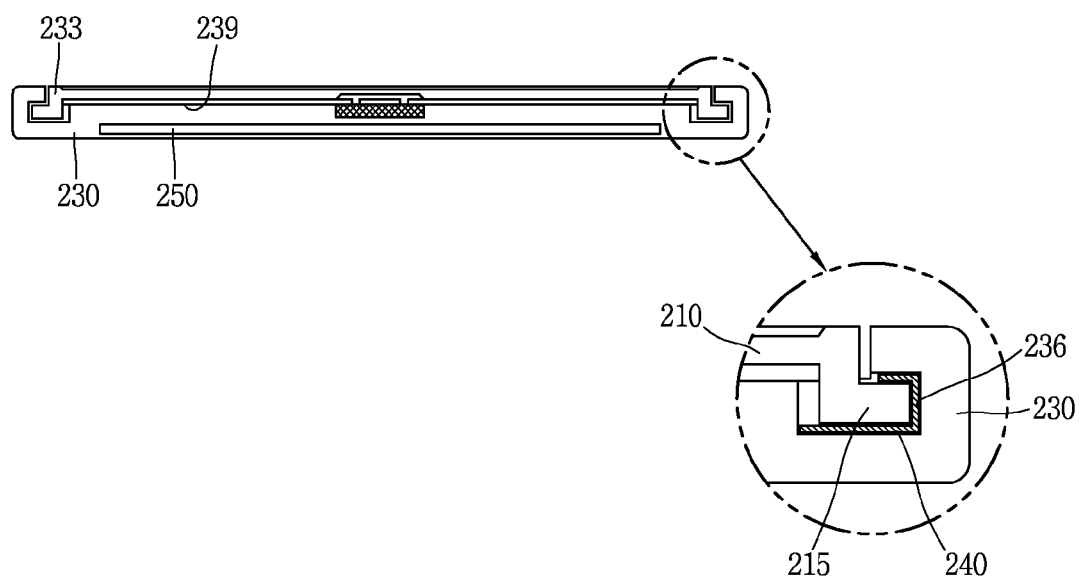
FIG. 8 is a cross-sectional view of a mobile terminal related to an exemplary embodiment of the present disclosure.

FIG. 8 is a cross-sectional view of a mobile terminal related to an exemplary embodiment of the present disclosure, taken along line X-X of FIG. 3A. Referring to FIG. 8, an accommodation portion 239 in which the movement unit 210 is installed is provided in the terminal body 230, and the guide grooves 236 are provided below the accommodation portion 239. The guide grooves 236 may be formed on both sides of upper and lower portions of the terminal body 230, and are provided to maintain a coupled state with the movement unit 230 which is rarely deformed. In this case, the rails 215 protrude downwardly and faces the side, so that the rails 215 are prevented from being released from the guide grooves 236.

In a state in which the rails 215 are inserted into the guide grooves 236, when the varied portion 230a is curved, that is, when the mobile terminal 200 is curved from the planar state to a curved state, the rails 215 move outwardly toward upper and lower ends of the guide grooves 236. Also, when the mobile terminal 200 is deformed from a curved state to a planar state, that is, when the varied portion 230a is changed from a curved state to a planar state, the rails 215 are moved inwardly in the guide grooves 236. In an exemplary embodiment of the present disclosure, by forming the rails 215 and the guide grooves 236, a predetermined section is provided in a state in which the movement unit 210 and the terminal body 230 are combined.

Here, as illustrated in FIG. 8, a friction reducing member 240 is provided between the rails 215 and the guide grooves 236 to allow the rails 215 to move in the guide grooves 236. The friction reducing member 240 may be formed of a poly oxy methylene material and disposed in a portion where the rails 215 and the guide grooves 236 are in contact with each other.

Also, the varied portion 230a includes a plurality of micro-blocks 231 disposed in the movement direction (or in a length direction of the mobile terminal 200) to form predetermined curvature and an elastic member 232a formed in the plurality of micro-blocks 231 to form predetermined curvature when an external force is applied or when external force is removed. The elastic member 232a connects the micro-blocks 231 to each other, and fastens the varied portion 230a to the fixed portions 230b and 230c.

The elastic member 232a may be a shape memory wire 232a formed to penetrate through the plurality of micro-blocks 231, but the present invention is not limited thereto. For example, the elastic member 232a may be any one among an elastic plate member 232b attached to the plurality of micro-blocks 231 or a coil spring 232c attached to the plurality of micro-blocks 231 or penetrating through the micro-blocks 231. Here, the coil spring 232c may be formed densely.

This will be described in detail with reference to FIGS. 11 through 14.

Figure 5:
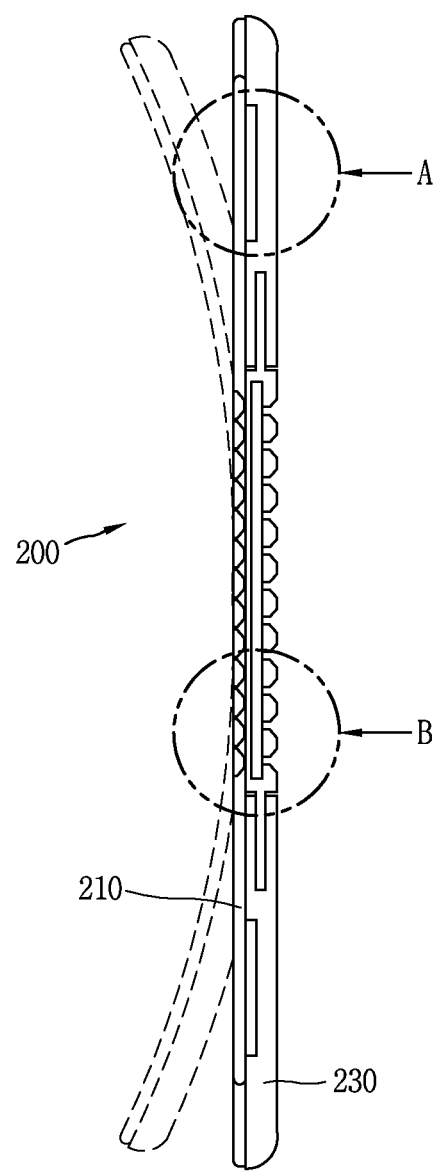
FIG. 5 is a side view of a mobile terminal related to an exemplary embodiment of the present disclosure.
Figure 6:
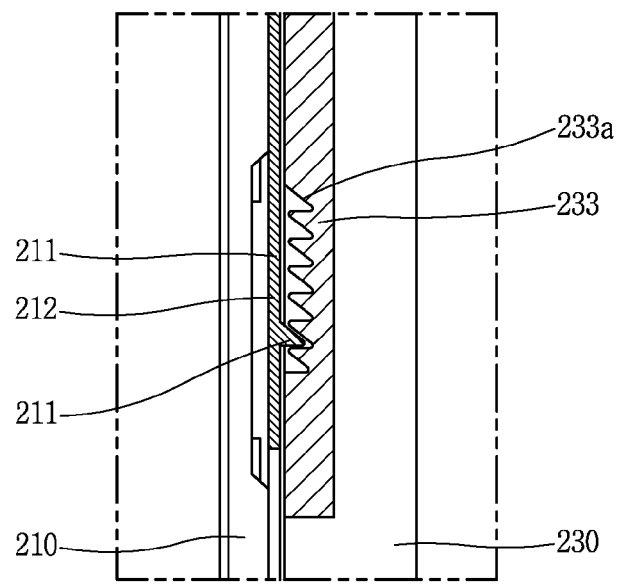
FIG. 6 is an enlarged view of a portion "A" in FIG. 5.
Figure 7:
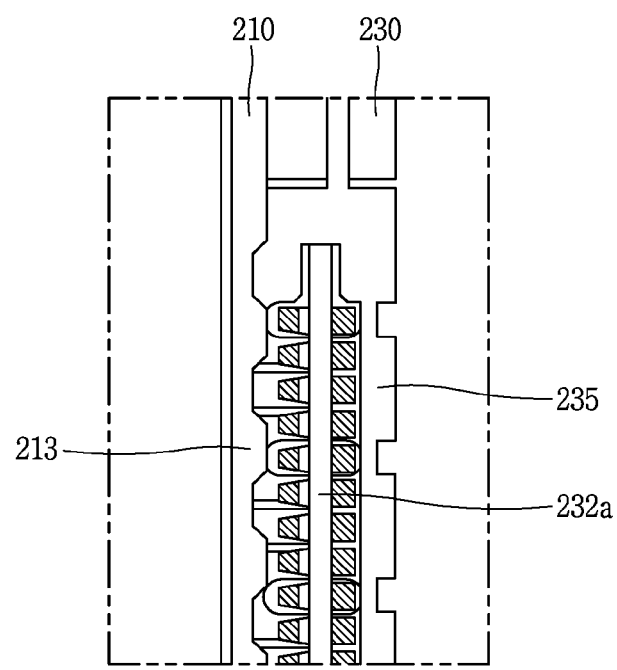
FIG. 7 is an enlarged view of a portion "B" in FIG. 5.

FIG. 5 is a side view of the mobile terminal 200 related to an exemplary embodiment of the present disclosure, which is a cross-sectional view taken along line Y-Y of FIG. 3A, FIG. 6 is an enlarged view of a portion "A" in FIG. 5, and FIG. 7 is an enlarged view of a portion "B" in FIG. 5.

Referring to FIGS. 5 through 7, upper and lower ends of the movement unit 210 move on the terminal body 230, coupling the movement unit 210 and the terminal body 230. When external force applied to the mobile terminal 200 is removed, even through the movement unit 210 and the terminal body 230 are in a coupled state, the mobile terminal 200 is returned to a planar state as a basic state. In order to prevent this and maintain the deformed state, in an exemplary embodiment of the present disclosure, stoppers 233 are formed in the fixed portions 230b and 230c, and a hook 211 is formed on a rear surface of the movement unit 210. The hook 211 may be fastened to the stopper 233 to maintain curvature of the varied portion 230a. That is, curvature is changed stepwise by using the stopper 233 and the hook 211. That is, a radius of the curvature may be adjusted by the stopper 233.

Here, as illustrated in FIG. 6, the hook 211 is coupled to the stopper 233 formed to have a plurality of stages, and the hook moves, while changing stages according to deformation of the varied portion 230a.

For example, FIG. 6 illustrates a case in which the terminal body 230 has a planar shape, in which the hook 211 is inserted into a recess 233a so as to be fixed. If the terminal body 230 is curved toward the movement unit 230 to enter a curved state, the hook 211 may move on the stopper 233 upwardly. This is because, as illustrated in FIG. 2C, a distance between the end of the movement unit 210 and the end of the terminal body 230 is reduced in the curved state.

Here, the hook 211 may be formed on one surface of a leaf spring 212. The hook 211 is prevented from being released from the recess 233a by the leaf spring 212. The hook 211 may not necessarily be integrated with the leaf spring 212, and it may be sufficient for the hook 211 to be provided with restoring force by the leaf spring 212. Thus, the leaf spring 212 may not be a leaf spring having a form in which a plurality of plates are stacked, and it may be sufficient for the hook 21 to be formed on a plate having restoring force.

Also, in an exemplary embodiment of the present disclosure, in order to allow the terminal body 230 to be curved according to curvature of the elastic members 232a, 232b, and 232c, both ends of the micro-blocks 231 are connected to side walls 235 of the varied portion, and the side walls 235 of the varied portion and a side wall 213 of the movement unit 210 have a concavo-convex shape. That is, the plurality of micro-blocks 231 are densely disposed, and the side walls 235 of the varied portion are formed in both ends of the micro-blocks 231, and thus, the micro-blocks 231 are fixed to the side walls 235 of the varied portion and integrally deformed. Here, the side walls 235 of the varied portion have a concavo-convex shape so as to be easily bent. Similarly, the side wall 213 of the movement portion also has a concavo-convex shape so as to be easily bent.

Also, when the movement unit 210 is curved, the surface of the movement unit 210 may be creased or uneven, and here, the micro-blocks 231 are disposed such that an empty space is not formed in the rear surface of the movement unit 210, thus preventing the movement unit 210, as an LCD panel, from being creased.

Figure 9:
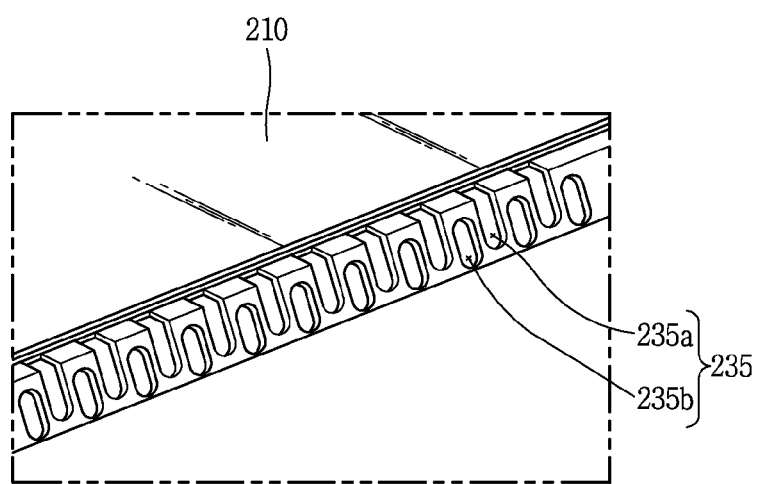
FIG. 9 is a partial perspective view of a varied portion related to an exemplary embodiment of the present disclosure.

In addition, as illustrated in FIG. 9, recesses 235a are formed at predetermined intervals on the side wall 235 of the varied portion, and holes 235b may be formed between the recesses 235a. That is, combination of the recesses 235a and holes 235b may implement the same function as that of depressions and protrusions. Here, the side wall 235 of the varied portion is formed of a polycarbonate (PC) material, maintaining a predetermined shape and providing rigidity to having a force connecting the fixed portion 230b and the fixed portion 230c. An inner side of the side wall 235 of the varied portion is formed of rubber, clogging the recesses 235a and the holes 235b to prevent introduction of foreign objects and reflecting deformation based on contraction and expansion.

Figure 10A:
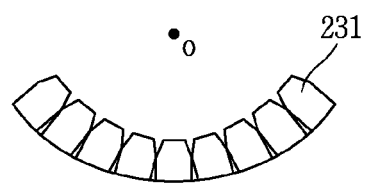
FIGS. 10A and 10B are views illustrating a curved state and a spread state of a micro block related to an exemplary embodiment of the present disclosure.
Figure 10B:
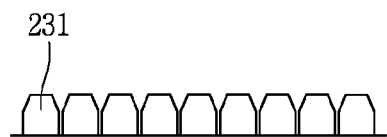

Also, as illustrated in FIG. 10, the micro-blocks 231 has a shape in which an upper portion thereof is narrow and a lower portion thereof is wide toward the center O of the curvature. FIG. 10A illustrates a state in which the micro-blocks 231 are curved to have a predetermined curvature, and FIG. 10B illustrates a state in which the micro-blocks 231 are spread to a planar surface. In this manner, since the micro-blocks 231 have the trapezoid shape in which the upper portion thereof is narrow and the lower portion thereof is wide, the micro-blocks may be curved to have a predetermined curvature without being interfered with adjacent micro-blocks.

Figure 11:
FIGS. 11 through 13 are cross-sectional views illustrating various examples of a mobile terminal related to an exemplary embodiment of the present disclosure.
Figure 12:
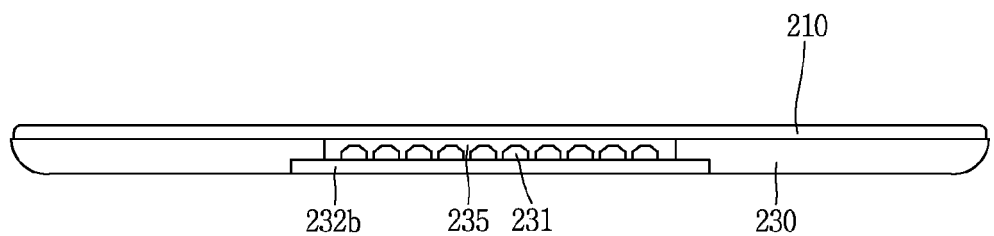
Figure 13:
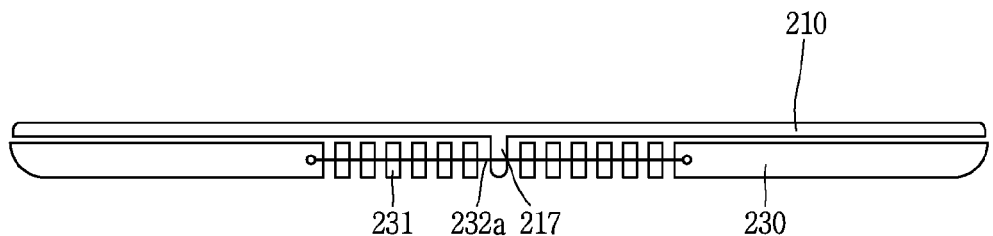

FIGS. 11 through 13 are cross-sectional views of the mobile terminal 200 according to an exemplary embodiment of the present disclosure. FIG. 11 illustrates a case in which two elastic plate members 232b having different strains are used, FIG. 12 illustrates a case in which an elastic plate member 232b is used below the micro-blocks 231, and FIG. 13 illustrates a case in which a protrusion protruding from a central portion of the movement unit 210 is coupled together with the micro-blocks 231 by a shape memory wire 232a.

As illustrated in FIG. 11, the varied portion 230a may include an upper elastic plate member 2321 and a lower elastic plate member 2322, whereby the mobile terminal 200 may be curved. Here, however, strains of the upper elastic plate member 2321 and the lower elastic plate member 2322 need to be different. In detail, the strain of the lower elastic plate member 2322 needs to be greater than that of the upper elastic plate member 2322. If the strains of the upper elastic plate member 2321 and the lower elastic plate member 2322 are equal, the upper elastic plate member 2321 may be creased. Here, although not shown in detail in FIG. 11, the micro block 231 may be disposed between the upper elastic plate member 2321 and the lower elastic plate member 2322.

Also, as illustrated in FIG. 12, the elastic plate member 232b may be disposed below the micro block 231 to provide restoring force to the micro block 231. Also, in this case, since the side wall 235 of the varied portion has a concavo-convex shape such that the mobile terminal may be curved readily.

In addition, as illustrated in FIG. 13, a protrusion 217 is formed in a central portion of the movement unit 210 and fixed to the center of the terminal body 230, whereby upper and lower portions of the mobile terminal 200 are curved in a balanced manner. That is, the upper and lower portions of the mobile terminal 200 may be curved or spread symmetrically, centered on the varied portion 230a.

Figure 14:
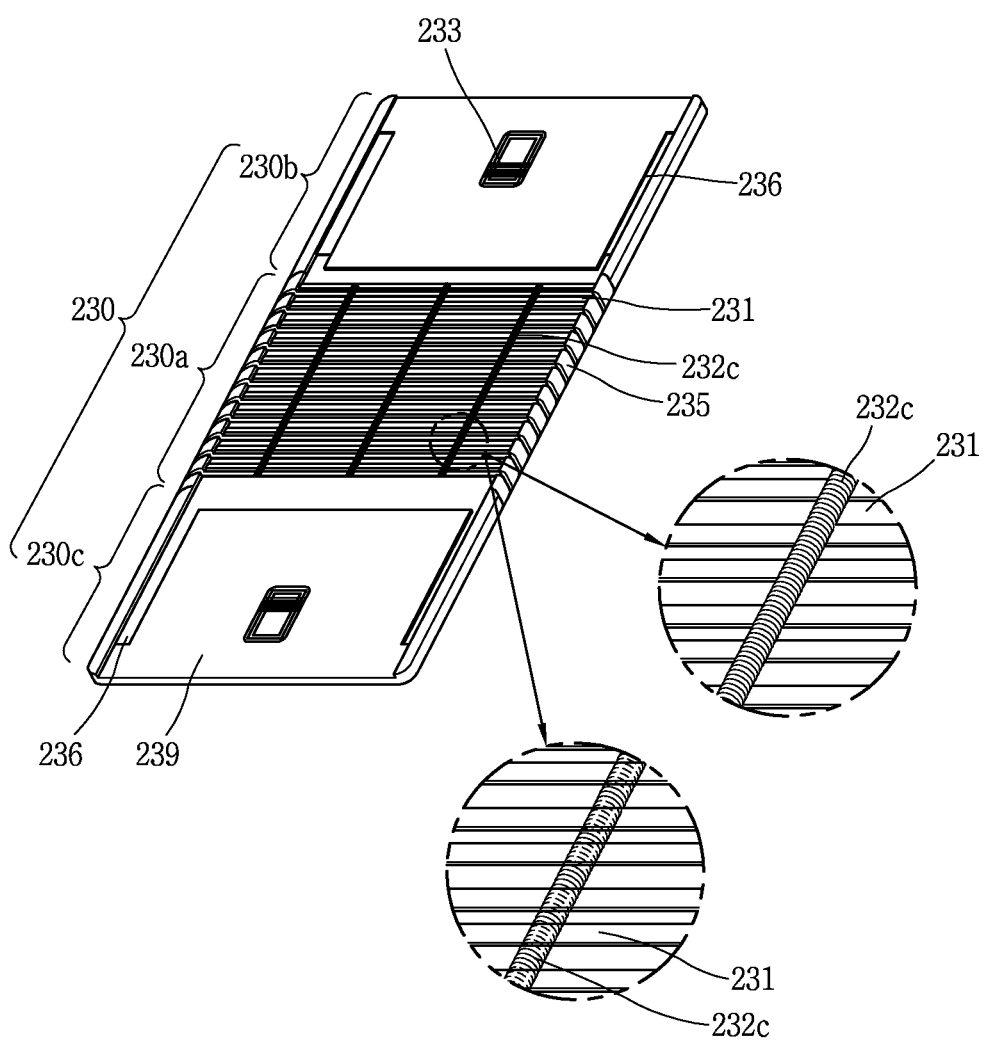
FIG. 14 is a front perspective view of a terminal body related to another exemplary embodiment of the present disclosure.

FIG. 14 is a front perspective view of a terminal body related to another exemplary embodiment of the present disclosure. Instead of the shape memory wire 232a used as an elastic member in FIG. 4, a coil spring 232c is used in FIG. 14. Here, the coil spring 232c may be attached to the micro block 231 or may be formed to penetrate through the micro block 231. The coil spring 232c may be formed densely, and in the case in which the coil spring 232c is formed to penetrate through the micro block 231, the mobile terminal may become thinner.

Figure 15A:
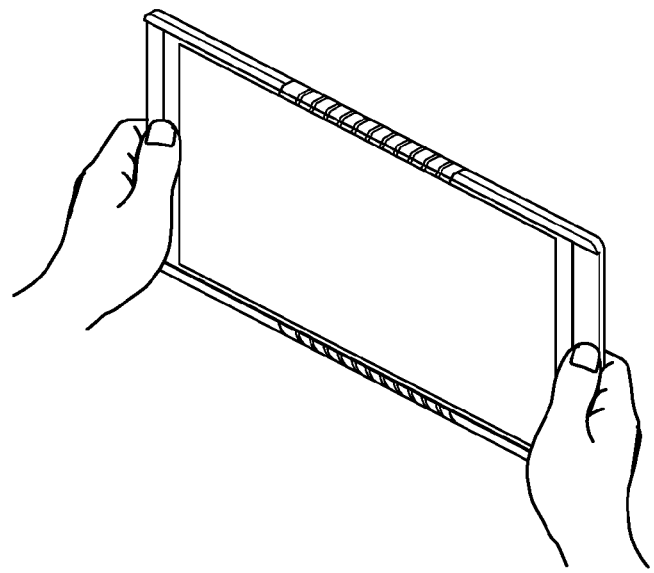
FIGS. 15A and 15B are views illustrating a way in which a mobile terminal is used related to an exemplary embodiment of the present disclosure.
Figure 15B:
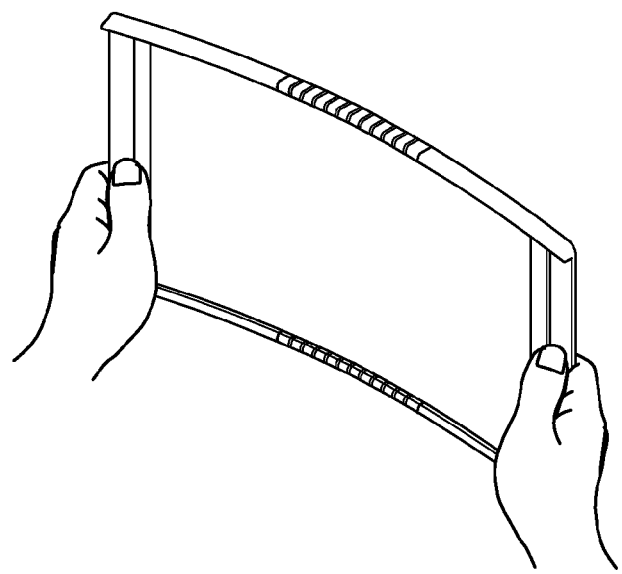

FIGS. 15A and 15B are views illustrating a method of controlling a mobile terminal related to an exemplary embodiment of the present disclosure. FIG. 15A is a view illustrating a planar state of the mobile terminal, and FIG. 15B is a view illustrating a curved state of the mobile terminal.

In an exemplary embodiment of the present disclosure, various user environments UX may be implemented by deforming the mobile terminal. For example, when the mobile terminal in a planar state is curved and spread one time, power of the mobile terminal may be turned on or off, and in a case in which imaging is performed, zoom-in or zoom-out may be implemented. Also, by curving the mobile terminal, the user may be more immersed in the display screen and someone else may be prevented from viewing the display screen (secret mode).

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a body in which an electronic component is installed;
    a movement unit fastened to the body in at least a portion thereof, configured to output information processed in the mobile terminal, and the movement unit being flexible on the body as curvature of the body is varied;
    rails provided on upper and lower ends of the movement unit; and
    guide grooves in which the rails are inserted,
    wherein the body includes a varied portion whose curvature is varied and fixed portions formed on both ends of the varied portion and having curvature which is not changed, wherein the varied portion includes:

a plurality of micro blocks formed in a movement direction and configured to form a predetermined curvature; and an elastic member formed in the micro blocks and enabling the micro blocks to form a predetermined curvature when external force is applied or when external force is removed, wherein the fixed portion includes therein a stopper having a plurality grooves formed along the movement direction and the varied portion includes therein a hook configured to fasten to one groove of the plurality grooves so as to maintain a curvature of the varied portion, and wherein the hook is further configured to move from the one groove to another groove of the plurality grooves according to a change in the curvature of the varied portion, and a strain of the upper elastic plate, wherein the elastic member includes an upper elastic plate member and a lower elastic plate member, and a strain of the lower elastic plate member is greater than the strain of the upper elastic plate member, and wherein the plurality of micro blocks are disposed between the upper and lower elastic plate member, wherein a friction reducing member is provided between the rails and the guide grooves.

2. The mobile terminal of claim 1, wherein both ends of the micro blocks are connected to a side wall of the varied portion, and a side wall of the varied portion and a side wall of the movement unit have a concavo-convex shape.

3. The mobile terminal of claim 2, wherein recesses are formed at predetermined intervals on the side wall of the varied portion, and holes are formed between the recesses.

4. The mobile terminal of claim 1, wherein the microblocks have a shape in which an upper portion thereof is narrow and a lower portion thereof is wide with respect to the center of the curvature.

* * * * *